United States Patent
Belt et al.

(10) Patent No.: US 6,756,451 B2
(45) Date of Patent: Jun. 29, 2004

(54) PROCESS FOR THE HYDROGENATION OF A POLYMER COMPOSED OF DIENE MONOMER UNITS AND A NITRILE GROUP-CONTAINING MONOMER

(75) Inventors: Johannes W. Belt, Geleen (NL); Olav M. Aagaard, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/036,495

(22) Filed: Jan. 7, 2002

(65) Prior Publication Data

US 2002/0091202 A1 Jul. 11, 2002

Related U.S. Application Data

(63) Continuation of application No. PCT/NL00/00450, filed on Jun. 28, 2000.

(30) Foreign Application Priority Data

Jul. 9, 1999 (NL) .............................................. 1012554
Jan. 27, 2000 (NL) .............................................. 1014201

(51) Int. Cl.$^7$ .......................... C08F 36/00; C08F 236/00
(52) U.S. Cl. .................... 525/338; 525/339; 525/328.3; 525/329.3; 524/93; 524/99; 524/251; 524/254; 524/323; 524/565

(58) Field of Search ................................. 525/338, 339, 525/328.3, 329.3; 524/93, 99, 251, 254, 323, 565

(56) References Cited

U.S. PATENT DOCUMENTS

| 3,658,789 A | 4/1972 | Fried |
| 3,767,628 A | 10/1973 | Kline |
| 4,452,950 A | 6/1984 | Wideman |
| 5,057,601 A | 10/1991 | Schiessl et al. |
| 5,068,313 A | 11/1991 | Schiessl |
| 5,221,714 A | 6/1993 | Parker |
| 5,424,356 A | * 6/1995 | Parker et al. ................ 524/555 |

FOREIGN PATENT DOCUMENTS

| WO | 0009568 | 2/2000 |

* cited by examiner

*Primary Examiner*—D. R. Wilson
(74) *Attorney, Agent, or Firm*—Pillsbury & Winthrop LLP

(57) ABSTRACT

Process for the hydrogenation of a polymer composed of conjugated diene monomer units and a nitrile group-containing monomer units, in which hydrogenation is carried out in the presence of hydrazine, and an oxidizing compound, with the hydrogenation being carried out in the presence of a antioxidant. It is preferred for NBR to be used as polymer.

20 Claims, No Drawings

PROCESS FOR THE HYDROGENATION OF A POLYMER COMPOSED OF DIENE MONOMER UNITS AND A NITRILE GROUP-CONTAINING MONOMER

This is a Continuation of International Application No. PCT/NL00/00450 filed Jun. 28, 2000 which designated the U.S. and was published in the English language. The contents of this PCT application are incorporated in their entirety by reference.

The invention relates to a process for the hydrogenation of a polymer composed of conjugated diene monomer units and nitrile group-containing monomer units, in which hydrogenation is carried out in the presence of hydrazine and an oxidizing compound.

It is possible to wholly or partially hydrogenate the double bonds present in the polymer chain of polymers that are composed of conjugated diene monomer units and nitrile group-containing monomer units, such as for instance nitrile butadiene rubber (NBR). After hydrogenation, the polymers are, for instance, less susceptible to oxidative degradation at elevated temperature and the polymers can be applied, for instance, under the bonnet in cars or even in the engine block.

Current commercial processes for hydrogenating such polymers are very cumbersome and costly. NBR is for instance dissolved in a suitable solvent and then hydrogenated with hydrogen at a high pressure and a high temperature in the presence of a noble metal catalyst. The catalyst and the solvent must subsequently be removed in a separate process step.

In addition, when high degrees of hydrogenation are achieved, side reactions take place that result in undesired branching of the polymer and even give rise to gelation.

U.S. Pat. No. 4,452,950 discloses the hydrogenation of NBR in the form of an aqueous dispersion in the presence of hydrazine, an oxidizing compound and a metal compound as catalyst. Following polymerization, NBR in itself is usually already present as an aqueous dispersion in the form of a latex. The polymer may also be formed as an aqueous dispersion. A metal compound of for example copper or iron is used as catalyst.

This in itself yields a simplified process for the hydrogenation, but a high degree of hydrogenation is difficult to achieve.

It is the aim of the invention to provide a process that does not have the above-mentioned drawback or has that drawback only to a much lesser extent.

Surprisingly, this aim is achieved by the hydrogenation being carried out in the presence of an antioxidant comprising more than 6 carbon atoms and chosen from a derivative of a substituted aromatic alcohol, of dihydroquinoline, of benzimidazole or of an aromatic secunary amine.

In the process of the invention, a higher degree of hydrogenation is attained under otherwise equal conditions. A further advantage of the process of the invention is that, in comparison with the known process, side reactions are at least strongly suppressed or even absent. Consequently, the development of undesired branching of the polymer or even the development of undesired gelation is avoided, so that the polymer can readily be compounded and can readily be processed to form moulded parts.

U.S. Pat. No. 5,221,714 discloses the teaching of Zhong and Lim whereby o-phenylenediamine can be utilized to catalyse the reaction of oxygen with residual hydrazine in an aqueous emulsion of rubber. However the above teaching learns the use of compounds with less than 6 carbon atoms which form complexes with the catalyst and further catalyse the hydrogenation reaction. These compounds have no effect on the formation of crosslinks.

While U.S. Pat. No. 5,424,356 discloses hydrogenation of NBR which is polymerized in the presence of a polymerizable antidegradant, it does not appear from that patent that the use of such NBR may have a favourable effect on how the hydrogenation reaction proceeds. The use of NBR that is polymerized in the presence of an antidegradant is excluded in the process of the invention, except in the case where the hydrogenation is carried out in the presence of a compound which contains an element from group 13 of the periodic system as catalyst the use of such NBR is not excluded.

Crosslinking of the latex during the hydrogenation process as described in U.S. Pat. No. 4,452,950 is mentioned in U.S. Pat. Nos. 5,039,737 and 5,442,009. Both patents disclose a process for breaking up the gel structures through post-treatment with ozone.

The unsaturated polymers that can be hydrogenated via the process of the present invention contain for example 5–95% by weight of the conjugated diene-monomer unit and 95–5% by weight of the nitrile group-containing monomer unit. Preferably, the polymer contains 50–80% by weight of the conjugated diene-monomer unit and 20–50% by weight of the nitrile group-containing monomer unit. More preferably, the polymer contains 60–70% by weight of the conjugated diene-monomer unit and 30–40% by weight of the nitrile group-containing monomer unit. Specific examples of conjugated diene-monomer units are 1,3-butadiene, 2,3-dimethyl butadiene, isoprene and 1,3-pentadiene. It is preferred for 1,3-butadiene to be used. Specific examples of a nitrile group-containing monomer units are acrylonitrile and methacrylonitrile. It is preferred for acrylonitrile to be used.

It is preferred for NBR to be used as polymer.

The polymers used in the process of the invention can be prepared by various processes such as emulsion polymerization, solution polymerization or bulk polymerization. Preferably, the polymers are prepared by emulsion polymerization, because in that case the polymer becomes available as a latex right away.

During hydrogenation, the polymers preferably are present in the latex form. The latex form is an aqueous emulsion of polymer, in which sundry additives such as soap and stabilisers may be present. A description of the latex form which is suitable for, for example, the hydrogenation of unsaturated polymers via the process of the invention is given in U.S. Pat. No. 5,442,009.

The polymer content of the latex is in the range from for example 1 to 70% by weight, preferably between 5 and 40% by weight.

It is possible for hydrazine to be present during the process of the invention in asmuch as it is added as such. It is also possible for a hydrazine-releasing compound to be added, such as hydrazine hydrates, hydrazine acetate, hydrazine sulphate and hydrazine hydrochloride. If the unsaturated polymer is hydrogenated in latex, use is preferably made of hydrazine and hydrazine hydrate.

Hydrazine preferably is present in a molar ratio of from 0.1:1 to 100:1 relative to the double bonds in the polymer chain. Preferably, this ratio lies between 0.8:1 and 5:1, most preferably between 0.9:1 and 2:1.

Examples of oxidizing agents that are suitable for use in the process of the invention are air, oxygen, ozone, peroxides, hydroperoxides, iodine, iodates, hypochlorite and similar compounds. Particularly suitable oxidizing agents are chosen from the group comprising peroxides and hydroperoxides. Most preferably, use is made of hydrogen peroxide.

The oxidizing compound is present in the polymer chain at a molar ratio of between 0.1:1 and 100:1 relative to the double bonds. This ratio preferably is between 0.8:1 and 5:1, most preferably between 0.9:1 and 2:1.

Examples of suitable antioxidants are given in Rubber Technology Handbook (ISBN 1-56990-145-7 (US), (Hanser/Gerdner Publications Inc., Cincinatti Ohio 1996), page 269. Specific examples of derivatives of a substituted aromatic alcohol, of dihydroquinoline, of benzimidazole or of an aromatic secundary amine, comprising more than 6 carbon atoms are derivatives of p-phenylenediamine, of trimethyl-dihydroquinoline, of naphthylamine and of mercaptobenzimidazole. It is preferred for a derivative of p-phenylenediamine to be used. Most preferably, N-isopropyl-N'-phenyl-p-phenylenediamine is used.

As antioxidant use is preferably made of a compound that is insoluble in water. Preferably, the antioxidant is added to the polymer prior to hydrogenation. It is preferred for the antioxidant to be added to the aqueous dispersion of the polymer in the form of an emulsion.

Good results are achieved when the antioxidant is added in an amount of 0.1–1.0% by weight relative to the amount of polymer. Preferably, the antioxidant is added in an amount of 0.1–0.5% by weight relative to the amount of polymer. The hydrogenation preferably is carried out in the presence of a catalyst. Suitable catalysts are compounds which contain an element from group 13 of the Periodic Table of the Elements as published on the inside of the cover of the Handbook of Chemistry and Physics, 67th edition, 1986–1987 in accordance with the latest IUPAC nomenclature.

It is preferred for the catalyst to contain boron (B). Examples of suitable B-containing catalysts are compounds of the general formula

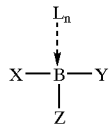

where X, Y and Z are chosen independently of one another from the group comprising R, OR, OOR, $NR_2$, SR, $PR_2$, OC(=O)R and halogen atoms, where R is a H atom or an alkyl, aryl or cycloalkyl group having 1–20 carbon atoms, or a hydrocarbon group having 1–20 C atoms and containing a heteroatom from groups 14, 15, 16 and 17 of the Periodic Table of the Elements;
L is an electron-donating ligand, such as water, an amine, pyridine, bipyridine, triazine, a pyrrole compound, an imidazole compound, a pyrazole compound, a pyrimidine compound and a pyrazine compound, an ester, ether, a furan, tetrahydrofuran, pyrans, dioxan, phosphine, phosphide, phosphate or a thio compound and n=0 or 1.

More preferably, a borate or a peroxyborate is used. Yet more preferably, boric acid ($H_3BO_3$) is used.

Also suitable for use as catalyst are compounds that contain a metal atom with an oxidation number of at least 4.

Examples of suitable compounds are compounds that contain a titanium atom with oxidation number 4 (Ti(IV)), a vanadium atom with oxidation number 5 (V(V)), a molybdenum atom with oxidation number 6 (Mo(VI)) or a tungsten atom with oxidation number 6 (W(VI)). Preferably, a compound which contains the W(VI) atom is used as catalyst. More preferably, a salt of tungstic acid is used. Most preferably, a sodium salt or potassium salt of tungstic acid is used.

The benefits of the present invention become especially apparent if a metal ion activator is used as catalyst for example a copper or an iron salt, like cuprous chloride or ferrous sulphate.

The molar ratio of the catalyst to the double bonds in the polymer chain is between for example 1:1000 and 10:1. The ratio preferably is between 1:50 and 1:2.

The order in which the compounds are added for the hydrogenation reaction may in principle be random. Preferably, however, the oxidizing compound is added after hydrazine, more preferably in such a way that the concentration of the oxidizing compound remains low during the hydrogenation reaction.

Although in the process of the invention the development of branches or gel particles in the hydrogenated polymer is very strongly suppressed in comparison with the known process, a further improved process of the invention is obtained if a compound that satisfies formula I is added after the hydrogenation or if a compound that satisfies formula II is added before, during or after hydrogenation.

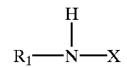

formula I

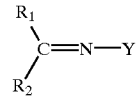

formula II where $R_1$ is a hydrogen atom, an alkyl or cycloalkyl group with 1–30 carbon atoms, or an aromatic group with 6–30 carbon atoms and $R_2$ is an alkyl or cycloalkyl group with 1–30 carbon atoms, or an aromatic group with 6–30 carbon atoms, X is chosen from the group comprising —$R_3$, —$OR_4$, —$SR_4$, —$NR_5R_6$, where $R_3$, $R_4$ and $R_5$ are a hydrogen atom, an alkyl or cycloalkyl group with 1–30 carbon atoms or an aromatic group with 6–30 carbon atoms and $R_6$ is an alkyl or cycloalkyl group with 1–30 carbon atoms or an aromatic group with 6–30 carbon atoms Y is chosen from the group comprising —$R_7$, —$OR_8$, —$SR_8$, —$NR_9R_{10}$ and —N=$CR_{11}R_{12}$, where $R_7$, $R_8$, $R_9$, $R_{10}$, $R_{11}$ and $R_{12}$ are a hydrogen atom, an alkyl or cycloalkyl group with 1–30 carbon atoms or an aromatic group with 6–30 carbon atoms, and it being possible for $R_3$-$R_{12}$ to also contain one or more heteroatoms from the groups 13, 14, 15, 16 or 17 of the Periodic System of the Elements.

Periodic System of the Elements should be taken to be the Periodic System as defined above.

The addition of such a compound causes strong or complete suppression of the crosslinking reaction. Moreover, addition of the compounds according to the invention has the advantage that no ozonolysis needs to be carried out in order to sever crosslinked polymer chains.

It is preferred for compounds to be used in which $R_1$ is a H atom.

Examples of compounds that satisfy formula I are primary and secondary amines, hydroxylamine, derivatives of hydroxylamine and substituted hydrazines, dithiocarbamylsulphenamide compounds, thiuram compounds and dithiocarbamate compounds. Specific examples are methylamine, ethylenediamine, dodecylamine, ethanolamine, cyclohexyldiamine, o-phenylenediamine, 3,4-toluenediamine, 1,8-naphthalenediamine, aniline, methylhydrazine, phenylhydrazine, o-aminophenol, o-aminobenzoic acid, hydroxylamine, N-isopropyl hydroxylamine, O-methylhydroxylamine, O-t-butylhydroxylamine and the sulphur compounds tetramethylthiuram disulphide, N-oxydiethylene dithiocarbamyl-N'-oxydiethylene-sulphenamide. Preferably, use is made of compounds that satisfy formula I where $R_3$ is an aromatic group with 6–15 carbon atoms, $R_4$ is a hydrogen atom, or an alkyl group with 1–5 carbon atoms, $R_5$ is a hydrogen atom, an alkyl group with 1–6 carbon atoms or an aromatic group with 6–10 carbon atoms and $R_6$ is an alkyl group with 1–6 carbon atoms or an aromatic group with 6–10 carbon atoms, it being possible for $R_3$–$R_6$ to also contain one or more heteroatoms from the groups 13, 14, 15, 16 or 17 of the Periodic System of the Elements. Most preferably, hydroxylamine or orthoaromatic diamines are used.

Examples of compounds that satisfy formula II are imines, azines, hydrazones, semicarbazones, oximes and benzothiazoles. Specific examples are N-phenylbutyl imine, N-isopropylbenzaldehyde imine, acetone azine, benzaldehyde azine, cyclohexanone azine, benzaldehyde hydrazone, benzophenone hydrazone, benzaldehyde oxime, p-nitrobenzaldehyde oxime, o-, p-, and m-chlorobenzaldehydeoxime, cyclohexanone oxime, acetonoxime, 2-mercaptobenzothiazole, N-cyclohexyl-2-benzothiazole sulphenamide methyl ethyl ketone oxime, benzophenone oxime.

Preferably, compounds are used that satisfy formula II, where $R_7$ is an aromatic group that contains 6–10 carbon atoms, $R_8$ is a hydrogen atom or an alkyl group with 1–6 carbon atoms, $R_9$–$R_{11}$ are a hydrogen atom, an alkyl group with 1–6 carbon atoms, or an aromatic group with 6–10 carbon atoms, and $R_{12}$ is an alkyl group with 1–6 carbon atoms or an aromatic group with 6–10 carbon atoms, it being possible for $R_7$–$R_{12}$ to also contain one or more heteroatoms from the groups 13, 14, 15, 16 or 17 of the Periodic System of the Elements. More preferably, use is made of compounds that satisfy formula II where Y is an OH-group. Most preferably, use is made of a compound that satisfies formula II where Y is an OH group, $R_1$ is a hydrogen atom and $R_2$ is an alkyl or cycloalkyl group with 1–15 carbon atoms or an aryl group with 6–10 carbon atoms. Examples of these compounds are benzaldehyde oxime, propionaldehyde oxime and dodecylaldehyde oxime.

Compounds that satisfy the description of formula I are added after the hydrogenation reaction, preferably before or during separation of the hydrogenated polymer, more preferably to the hydrogenated polymer during a post-treatment. Surprisingly, this suppresses the crosslinking reaction in the hydrogenated polymer even further. In particular, crosslinking during storage of the polymer is suppressed more strongly. This is important for instance if a hydrogenated polymer with a high molecular weight is used. The occurrence of a crosslinking reaction has a strong effect on the theological properties of such a polymer.

Hydroxylamine is preferably added to the hydrogenated polymer in the form of an aqueous solution. Most preferably, the hydrogenated polymer is contacted with a 1–20 wt: % solution of hydroxylamine in water.

More preferably, a combination of an oxime, of the general formula II, where Y is an OH group, $R_1$ is a hydrogen atom and $R_2$ is an alkyl or cycloalkyl group with 1–15 carbon atoms or an aryl group with 6–10 carbon atoms, and hydroxylamine is added. The oxime is then preferably added before or during the hydrogenation of the polymer, while the hydroxylamine is added during post-treatment of the hydrogenated polymer crumb.

Even more preferably, a compound according to formula I or II is present during kneading of hydrogenated polymer at elevated temperature. The kneading temperature preferably lies between 50 and 300° C., most preferably between 100 en 200° C.

Most preferably, the hydrogenated polymer is kneaded in the presence of a compound according to formula I, with also a carbonyl group-containing compound (for instance an aldehyde or ketone) being present. Most preferably, a ketone is used. Examples of suitable ketones are acetophenone, benzophenone and 2-dodecylketone. This further accelerates the degradation of crosslinks by the action of the compounds according to the invention, so that the kneading time and/or the kneading temperature can be reduced. Special preference is given to o-aromatic diamines as the compounds according to formula I in combination with a ketone. Preferably, o-phenylenediamine or 3,4-toluenediamine are used.

The hydrogenation can be carried out batch-wise or continuously. Sealed or opened vesels may be used.

The amount of double bonds to be hydrogenated may represent only a proportion of the total amount of double bonds present in the polymer chain.

The degree of hydrogenation is (A/B)×100%, where A is the amount of double bonds that is saturated as a result of the hydrogenation reaction and B is the initial amount of double bonds. The process of the present invention provides polymers that have a degree of hydrogenation higher than, say, 60%. Preferably, the degree of hydrogenation is higher than 80%. The process is eminently suitable for preparing polymers having a degree of hydrogenation higher than 90%.

The hydrogenation reaction temperature is between 0° and 250° C. The temperature preferably is between 20° and 150° C. A reaction temperature between 30° and 80° C. is particularly preferable.

During hydrogenation in a latex, a minor amount of solvent for the unsaturated polymer may be present. In that case, the amount of solvent may vary between 0 and 20% by weight (solvent relative to polymer).

The hydrogenation time normally is between 1 minute and 24 hours. The hydrogenation time preferably is between 1 hour and 12 hours.

The process is illustrated by the following examples without being limited thereto.

In almost all cases the degree of hydrogenation was determined with the aid of $^1$H-NMR in a Bruker 200 MHz instrument. The measurement was conducted on precipitated polymer that was dissolved in deuterated chloroform. The degree of hydrogenation was calculated from the ratio of the integrals of the olefinic protons, which are between 5.2 and 5.6 ppm, and the proton adjacent to the nitrile group, being between 2.35 and 2.65 ppm.

Comparative Experiment A

A mixture of 620 grams of hydrazine monohydrate, 100 grams of boric acid, 500 grams of water and a few drops of silicone oil was added to 4 liters of latex which contained 25% by weight of Nysin™ 33-3, an NBR containing 67% by weight of butadiene monomer units, in a stirred vessel. After the temperature had been adjusted to 40° C., 1615 grams of a 30% m/m (=on a mass basis) solution of hydrogen peroxide in water were added in 12 hours.

Next, 50 grams of the latex were precipitated in 400 grams of a 0.5% (m/m)solution of $MgSO_4.7H_2O$ and in a 50% (m/m) solution of hydroxylamine in water for 48 hours. The degree of hydrogenation was 82%.

EXAMPLE I

Comparative experiment A was repeated except that there had been added to the latex 1% by weight of the antioxidant Flexone 11 L based on the amount of Nysin™ 33-3. Flexon 11L is an emulsion of (N-1,4-dimethylphenyl(-N'-phenyl)-p-phenylenediamine (7-PPD). The degree of hydrogenation appeared to be 89%.

Comparison of Example 1 and Comparative Experiment A indicates that, by adding the antioxidant in Example I, a higher degree of hydrogenation is achieved under otherwise equal conditions.

Comparative Experiment B 500 grams of latex were separated from the hydrogenated latex in Comparative Experiment A. The polymer was precipitated out of the latex by adding drop-wise 15 grams of a 36% (m/m) solution of $MgSO_4 \cdot 7H_2O$ and with vehement stirring. Next, the precipitated polymer was dried in air at 70° C. in about 16 hours. The polymer subsequently completely dissolved in chloroform.

Next, a mixture of 40 grams of the polymer and 2 grams of o-phenylenediamine were kneaded in a Brabender™ plasticorder at a temperature of 150° C. After 10 minutes an attempt was made to dissolve the polymer in chloroform. At that point the polymer was found to contain gel particles.

EXAMPLE 2

Comparative example B was repeated except that the hydrogenated latex obtained in Example 1 was used. This polymer was found to completely dissolve in chloroform even after kneading in the Brabender™ plasticorder.

What is claimed is:

1. Process for the hydrogenation of a polymer composed of conjugated diene monomer units and a nitrile group-containing monomer units, which comprises carrying out the hydrogenation in the presence of hydrazine, an oxidizing compound, an antioxidant comprising more than 6 carbon atoms and chosen from a substituted aromatic alcohol antioxidant, dihydroquinoline antioxidant, benzimidazole antioxidant or an aromatic secondary amine antioxidant, and wherein the antioxidant is added to the polymer prior to hydrogenation, and further wherein said polymer is other than a nitrile-butadiene rubber that is polymerized in the presence of an antidegradant.

2. Process according to claim 1, wherein nitrile-butadiene rubber which was not polymerized in the presence of an antidegradant is used as the polymer.

3. Process according to claim 2, wherein the nitrile-butadiene rubber is one which was prepared in the absence of a polymerizable antidegradant.

4. Process according to claim 1, wherein the antioxidant is a p-phenylenediamine antioxidant.

5. Process according to claim 1, wherein N-isopropyl-N'-phenyl-p-phenylenediamine is used as antioxidant.

6. Process according to claim 1, wherein the molar ratio of hydrazine compound/double bonds is between 0.9/1 and 2/1.

7. Process according to claim 1, wherein the molar ratio of oxidizing compound/double bonds is between 0.9/1 and 2/1.

8. Process according to claim 1, wherein the oxidizing compound is added to the reaction mixture after hydrazine.

9. Process according to claim 1, wherein the polymer is present in the latex form.

10. Process according to claim 1, wherein the oxidizing compound is hydrogen peroxide.

11. Process according to claim 1, wherein the hydrogenation is carried out in the presence of a compound which contains an element from group 13 of the periodic table as catalyst.

12. Process according to claim 11, wherein the catalyst is a boron-containing compound.

13. Process according to claim 12, wherein the boron-containing compound is a compound of formula

where X, Y and Z, are, independently, R, OR, OOR, $NR_2$, SR, $PR_2$, OC(=O)R or halogen atom, where R represents a hydrogen atom or an alkyl, aryl or cycloalkyl group having 1 to 20 carbon atoms, or a hydrocarbon group containing 1 to 20 carbon atoms and a heteroatom from groups 14, 15, 16 or 17 of the periodic table of the elements; L is an electron-donating ligand and n=0 or 1.

14. Process according to claim 12, wherein the boron-containing compound is a borate or a peroxyborate.

15. Process according to claim 12, wherein the boron-containing compound is boric acid.

16. Process according to claim 1, further comprising adding a compound of formula I to the hydrogenated polymer:

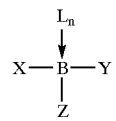  (I)

where $R_1$ represents a hydrogen atom, an alkyl or cycloalkyl group with from 1 to 30 carbon atoms, or an aromatic group with 6 to 30 carbon atoms; and X represents —$R_3$, —$OR_4$, —$SR_4$ or —$NR_5R_6$,
where $R_3$, $R_4$, and $R_5$, independently, represent a hydrogen atom, an alkyl or cycloalkyl group with from 1 to 30 carbon atoms, or an aromatic group with 6 to 30 carbon atoms, and $R_6$ represents an alkyl or cycloalkyl group with from 1 to 30 carbon atoms, or an aromatic group with 6 to 30 carbon atoms.

17. Process according to claim 1, further comprising adding a compound of formula II before, during or after the hydrogenation:

  (II)

where $R_1$ represents a hydrogen atom, an alkyl or cycloalkyl group with from 1 to 30 carbon atoms, or an aromatic group with 6 to 30 carbon atoms;

$R_2$ represents an alkyl or cycloalkyl group with from 1 to 30 carbon atoms, or an aromatic group with 6 to 30 carbon atoms, and Y represents —$R_7$, —$OR_8$, —$SR_8$, —$NR_9R_{10}$ or —N=$CR_{11}R_{12}$, where $R_7$, $R_8$, $R_9$, $R_{10}$, $R_{11}$ and $R_{12}$, independently, represent a hydrogen atom, an alkyl or cycloalkyl group with from 1 to 30 carbon atoms, or an aromatic group with 6 to 30 carbon atoms, and wherein, any of $R_3$ to $R_{12}$ may contain one or more heteroatoms from groups 13, 14, 15, 16 or 17 of the periodic table of the elements.

18. Process according to claim 1, wherein the antioxidant is a trimethyl-dihydroquinoline antioxidant.

19. Process according to claim 1, wherein the antioxidant is a naphthylamine antioxidant.

20. Process according to claim 1, wherein the antioxidant is a mercaptobenzimidazole antioxidant.

* * * * *